United States Patent [19]

Williams et al.

[11] Patent Number: 5,209,859

[45] Date of Patent: * May 11, 1993

[54] INHIBITED ACID SYSTEM FOR ACIDIZING WELLS

[75] Inventors: Dennis A. Williams; Phyllis K. Holifield; James R. Looney; Lee A. McDougall, all of Houston, Tex.

[73] Assignee: Exxon Chemical Patents, Inc., Linden, N.J.

[*] Notice: The portion of the term of this patent subsequent to Mar. 26, 2008 has been disclaimed.

[21] Appl. No.: 835,704

[22] Filed: Feb. 12, 1992

Related U.S. Application Data

[63] Continuation of Ser. No. 494,673, Mar. 16, 1990, Pat. No. 5,089,153.

[51] Int. Cl.$^5$ .................... E21B 43/27; C11D 7/48; C23F 11/16
[52] U.S. Cl. .................... 252/8.555; 252/8.552; 252/8.553
[58] Field of Search .............. 252/8.555, 8.553, 8.552, 252/389; 166/279, 304, 307, 902; 422/12

[56] References Cited

U.S. PATENT DOCUMENTS

| | | | |
|---|---|---|---|
| 3,773,465 | 11/1973 | Keeney et al. | 252/389 |
| 3,962,101 | 6/1976 | Crowe | 166/307 X |
| 4,028,268 | 6/1977 | Sullivan et al. | 252/392 |
| 4,498,997 | 2/1985 | Walker | 252/8.553 |
| 4,522,658 | 6/1985 | Walker | 252/8.553 X |
| 4,522,672 | 12/1985 | Walker | 252/8.553 |
| 4,737,296 | 4/1988 | Watkins | 252/8.553 |
| 4,738,789 | 4/1989 | Jones | 252/8.553 |
| 4,882,075 | 11/1989 | Jones | 252/8.553 |
| 4,997,040 | 3/1991 | Cizek | 166/307 |
| 5,034,140 | 7/1991 | Gardner et al. | 252/8.553 |
| 5,058,678 | 10/1991 | Dill et al. | 252/8.553 X |
| 5,120,471 | 6/1992 | Jasinski et al. | |

Primary Examiner—Richard D. Lovering
Assistant Examiner—C. Sayala
Attorney, Agent, or Firm—R. L. Graham

[57] ABSTRACT

An acid system for acidizing wells contains corrosion inhibitor additives which consist essentially of a metal selected from antimony and antimony mixtures, a quaternary compound, and a surfactant. The corrosion inhibitor is free of toxic acetylenic compounds.

6 Claims, No Drawings

INHIBITED ACID SYSTEM FOR ACIDIZING WELLS

RELATED U.S. APPLICATIONS

This is a continuation of U.S. patent application Ser. No. 494,673, filed Mar. 16, 1990, now U.S. Pat. No. 5,089,153.

BACKGROUND OF THE INVENTION

This invention relates generally to corrosion inhibitors and more specifically to the use of corrosion inhibitors containing quaternary/antimony complex in acid solutions used in acid treatment of subterranean formations without acetylenic alcohols. In one aspect, the invention relates to the direct addition of the corrosion inhibitor additives directly to the aqueous acid solution used in well acidizing.

DESCRIPTION OF THE PRIOR ART

Acids and acid solutions have long been used in the stimulation of oil wells, gas wells, water wells, and similar boreholes. Acid stimulation is performed in wells completed in subterranean formations. Acidizing is used in conjunction with hydraulic fracturing techniques and matrix acidizing techniques. In both acid fracturing and matrix acidizing, the well treating acid solutions, usually HCl, HF, or mixtures thereof, are pumped through the well tubular goods and injected into the formation where the acid attacks formation materials increasing its permeability to oil and/or gas.

In order to protect the equipment and tubular goods from the corrosive effects of the acid, the well treating acid almost always includes a corrosion inhibitor.

Corrosion inhibitors of diverse description and composition have been proposed over the years for use with well treating acids. Corrosion inhibitors that have received wide spread use are those containing metal/quaternary ammonium complexes. Some of these are described in the following U.S. Pat. Nos. 3,773,465 (cuprous iodide); 4,498,997; 4,522,658; and 4,552,672 (antimony compounds).

In the past, the metal/quaternary complexes, have been used with an acetylenic compound which apparently contributes to the effectiveness of the complex, particularly at high temperatures and high concentrations. Corrosion inhibitors containing acetylenic compounds are toxic. Therefore, it is desirable to avoid the use of the acetylenics where possible.

SUMMARY OF THE INVENTION

The method of the present invention comprises the steps of adding directly to a well treating aqueous acidizing solution corrosion inhibitor additives consisting essentially of:
(a) a surfactant;
(b) an antimony compound or antimony metal mixture; and
(c) an ammonium quaternary compound capable of forming a complex with the antimony and other metals in the mixture.

Surprisingly, it has been found that the nonacetylenic corrosion inhibitor additives described above, when added directly to the aqueous acid solution, exhibits excellent dispersion and provides improved corrosion protection for the well equipment at relatively low concentrations in comparison to corrosion inhibitors with acetylenics and aromatic hydrocarbons.

Although the reasons for the improved performance are not fully understood, it is believed that the acetylenic compound and/or the aromatic hydrocarbon solvent interfere with deposition of the antimony on the well tubulars.

The concentrations of the three essential additives in the acid solution are as follows:

| Component | BROAD RANGE (wt %) | PREFERRED RANGE (wt %) | MOST PREFERRED RANGE (wt %) |
|---|---|---|---|
| Metal/Metal Mixture | .04 to 2.0 | .05 to 1.0 | .07 to .80 |
| Quaternary Compound | 0.2 to 10 | 0.4 to 5.0 | 0.4 to 2.2 |
| Surfactant | 0.1 to 25 | 0.1 to 5.0 | 0.1 to 1.5 |

Generally, the component ranges are interchangeable. For example, the most preferred range of a metal component may be used with both the broad and preferred ranges of the other components. The metal compound will always include antimony, either alone or as one compound of a binary or ternary blend. At least 0.04 wt % of antimony should be present in the acid.

The corrosion inhibitor components are separately introduced into the well treating acid at a concentration sufficient to coat the well tubulars and equipment. The concentration of each component in the acid solution should generally be sufficient to provide the acid solution with from 0.04 wt % to 0.80 wt % of Sb.

The method of the present invention provides effective corrosion high temperature protection associated with metal salt complexes and employs low toxicity additives which are separately dispersible in the aqueous acid solution. The method of the present invention offers the operational advantage of direct addition and dispersion in the acidizing solution without preformulation. The corrosion inhibitors with acetylenic compounds of the prior art generally required solvents and premixture of at least some of the components.

DESCRIPTION OF PREFERRED EMBODIMENTS

As indicated above the method of the present invention employs only three essential additives which combine in situ when added to a well treating acid solution to provide effective corrosion inhibition. Each of these compounds as well as the acid solution in which they are used are described below.

Aqueous Acid Solutions: Any of the known oil field acids may be used. These are referred to herein as "well treating acids" and include aqueous solutions of hydrochloric acid (HCl), hydrofluoric acid (HF), mixtures of HCl and HF (i.e. mud acid), acetic acid, formic acid, and other organic acids and anhydrides. The most common acids are 3% HCl, 7½% HCl, 15% HCl, 28% HCl and blends of HCl and HF (mud acid). Mud acid is normally a blend of 6 to 12% of HCl and 1½ to 6% HF.

Antimony Compounds and Mixtures: The function of the antimony and/or the metal mixed therewith is to complex with the quaternary ammonium compound and form a protective deposit on the metal tubulars and equipment.

Tests have shown that salts of the following metals and mixtures thereof exhibit corrosion protection when complexed with a quaternary ammonium compound or compounds: Sb, Sb/Al, Sb/Al/Cu+, Sb/Cu+, Sb/Ca/Cu+, and Ca/Sb. The preferred metals are Sb alone and Sb, Cu+, and Ca binary and ternary mixtures.

The metal salts or mixtures must be readily dispersible in the aqueous acid solution and form a complex with the quaternary ammonium compound. The term "complex" as used herein means a coordination or association of the metal compound with the quaternary compound.

The preferred antimony salts and salts of the mixture are halides, specifically metal chlorides. Some of the salts may be formed in situ, in acid solution. For example, antimony chloride is produced from $Sb_2O_3$ in aqueous acid such as HCl. The insoluble $Sb_2O_3$ is converted to soluble salt.

The antimony compound may comprise, for example, antimony trichloride, antimony pentachloride, antimony trifluoride, alkali metal salts of antimony tartrate, antimony adducts of ethylene glycol, and antimony trioxide or any other trivalent or pentavalent antimony compound and the like. As mentioned above, the antimony oxides may be converted to halide salts in the presence of aqueous acid.

The cuprous compound may be cuprous iodide as described in U.S. Pat. No. 3,773,465, the disclosure of which is incorporated herein by reference.

The binary and ternary metal mixtures are preferred for particularly severe corrosive environments since they appear to combine synergistically to provide protection. The binary and ternary metals may be mixed in any ratio, provided Sb constitutes at least 20 wt %, preferably 30 wt %, of the metal mixture.

Quaternary Compounds: The quaternary ammonium compounds (referred to as "quaternary" herein) employed in the present invention must be capable of complexing with the antimony and other metals of the metal mixture (if employed). The preferred quaternary comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, quinoline-N-(chloro-benzyl chloride) quaternary, isoquinoline quaternaries, benzoquinoline quaternaries, chloromethyl napthalene quaternaries and admixtures of such compounds, and the like. The quaternary compound and Sb and Sb mixtures may be used in molar ratios of 1:1 to 5:1. Generally, the quaternary compound, because of its higher molecular weight, will be present in the acid solution at a higher concentration than the metal compound. The weight ratios of the quaternary compound and the Sb and Sb mixtures thereof preferably range from 1:1 to 4:1.

The Surfactant: The surfactant serves to wet the tubular goods to permit deposition of the quaternary/metal complex. The preferred surfactants are the nonionics having hydrophilic-lipophilic balance (HLB) numbers of 8 to 18, preferably 9 to 16, such as laurates, stearates, and oleates. Nonionic surfactants include the polyoxyethylene surfactants (such as ethoxylated alkyl phenols, ethoxylated aliphatic alcohols) polyethylene glycol esters of fatty, resin, and tall oil acids. Examples of such surfactants are polyoxyethylene alkyl phenol wherein the alkyl group is linear or branched $C_8$–$C_{12}$ and contains above about 60 wt % polyoxyethylene. Octyl and nonyl phenols containing 9 to 15 moles ethylene oxide per mole hydrophobe are the preferred ethoxylated alkyl phenol surfactants.

The polyoxyethylene ester of fatty acids include the mono and dioleates and sesquioleates wherein the molecular weight of the esterified polyethylene glycol is between about 200 and 1000.

Polyoxyethylene sorbitan oleates are also useable.

In practice, the nonionics may be blended to provide the desired properties. A particularly useful surfactant is a blend of polyethylene glycol esters of fatty acids and ethoxylated alkylphenols.

Operation: In operation, the three essential additives are added to the aqueous acid solution at the well site. The additives may be added in any order but preferably are in the following order: (1) surfactant; (2) quaternary compound; (3) and metal compound. The concentration of quaternary/metal complex in the acid solution should preferably provide a metal (including Sb) concentration of at 0.050 wt %.

The procedure for preparing the inhibited acid for pumping down the well is preferably by a batch process. In this process, the additives are blended into the aqueous acid solution in a large tank and then pumped into the well.

It has been found that the direct addition of the additives requires only a few minutes for dispersion and complexing to occur, so that any pumping process including the continuous process may be employed. The batch process, however, is preferred because it assures adequate conditioning of the corrosion inhibitor in the acid prior to pumping.

The method of the present invention can be used in wells to protect tubular goods made of typical oil field tubular steels such as J-55, N-80, P:105, and the like; or made of high alloy chrome steels such as Cr-9, Cr-13, Cr-2205, Cr-2250, and the like.

EXPERIMENTS

In order to demonstrate the effectiveness of the nonacetylenic corrosion inhibitor additives added directly to the acid solution, several samples with and without acetylenics were tested using various components. The additives used in the tests were as follows.

The quaternary ammonium compounds used in the experiments was a quinoline-N-benzyl chloride quaternary (quaternary X).

The surfactant was nonylphenol (10 mols EO).

The HCl acid was 15% HCl.

The HF was 12% HCl and 3% HF.

The acetylenic compounds were a blend of ethyl octynol and propargyl in wt ratios of 1 to 1 or 2 to 3.

The Sb compounds were $Sb_2O_3$.

The procedure for preparing the aqueous acid solution with inhibitor and the test procedure was as follows (all % are wt % unless otherwise indicated)

1. The additives were added to the aqueous acid solution [(15% HCl or mud acid, (12% HCl/3% HF)] in the following order
   (a) surfactant
   (b) acetylenic alcohol
   (c) aromatic hydrocarbon solvent (if used)
   (d) quaternary compound
   (e) $Sb_2O_3$
2. The coupouns (N-80 steel or Cr-2205) were then put in the acid solution with the additives and heated to 350° F. under 3,000 psi for four hours.
3. The coupouns were then removed and cleaned, the weight loss measured, and the corrosion rate calculated.

The composition of the samples tested are shown in Tables I and II.

TABLE I

ACETYLENIC SAMPLES

| Sample | Surfactant | Acet. | Solvent | Quat. | Sb | Acid |
|---|---|---|---|---|---|---|
| A-1 | 0.37 | 0.35–0.40 | 0.37–0.40 | 1.12 | 0.075 | HCl |
| A-2 | 0.37 | 0.35–0.40 | 0.37–0.40 | 1.12 | 0.15 | Mud |
| A-3 | 0.37 | 0.35–0.40 | 0.37–0.40 | 0.60 | 0.75 | HCl |
| A-4 | 0.37 | 0.35–0.40 | 0.37–0.40 | 0.60 | 0.75 | Mud |

Additives (wt %)

TABLE II

NONACETYLENIC SAMPLES

Additives (wt %)

| Sample | Surfactant | Quat. | Sb | Acid |
|---|---|---|---|---|
| NA-1 | 0.37 | 1.12 | 0.075 | HCl |
| NA-2 | 0.37 | 1.12 | 0.15 | Mud |
| NA-3 | 0.37 | 0.6 | 0.75 | HCl |
| NA-4 | 0.37 | 0.6 | 0.75 | Mud |

The corrosion rates, expressed as pound/ft$^2$, using the above samples are presented in Table III.

TABLE III

| | HCl Corrosion Rate In | | | Mud Acid Corrosion Rate In | |
|---|---|---|---|---|---|
| Sample | N-80 | Cr-2205 | Sample | N-80 | Cr-2205 |
| A-1 | 0.0156 | 0.0262 | A-2 | 0.0302 | 0.0182 |
| NA-1 | 0.0098 | 0.0158 | NA-2 | 0.0245 | 0.0107 |
| A-3 | 0.0095 | 0.0089 | A-4 | 0.0078 | 0.0109 |
| NA-3 | 0.0056 | 0.0060 | NA-4 | 0.0052 | 0.0072 |

From the Table III data, it can be seen that the nonacetylenic samples (NA) gave improved results in all tests.

Additional samples were prepared and tests were carried out using binary and ternary mixtures of Sb. These samples had the compositions shown in Table IV.

TABLE IV

Additive (wt %)

| Sample | Surfactant | Quat. | Sb Mixture[1] | Acid |
|---|---|---|---|---|
| NA-5 | 0.37 | 1.12 | Sb/Al | HCl |
| NA-6 | 0.37 | 1.12 | Sb/Al | Mud |
| NA-7 | 0.37 | 1.12 | Sb/Al/Cu$^+$ | HCl |
| NA-8 | 0.37 | 1.12 | Sb/Al/Cu$^+$ | Mud |
| NA-9 | 0.37 | 1.12 | Sb/Ca | HCl |
| NA-10 | 0.37 | 1.12 | Sb/Ca | Mud |
| NA-11 | 0.37 | 1.12 | Sb/Cu$^+$ | HCl |
| NA-12 | 0.37 | 1.12 | Sb/Cu$^+$ | Mud |
| NA-13 | 0.37 | 1.12 | Sb/Ca/Cu$^+$ | HCl |
| NA-14 | 0.37 | 1.12 | Sb/Ca/Cu$^+$ | Mud |

[1]The Sb mixtures were as follows (all wt %):
Sb/Al: Mixture of Sb$_2$O$_3$ and AlCl$_3$ (Sb 0.38%; Al 0.101%)
Sb/Al/Cu$^+$: Mixture of Sb$_2$O$_3$, AlCl$_3$, and CuI (Sb 0.25%; Al 0.067%; and Cu$^+$ 0.109%)
Sb/Ca: Mixture of Sb$_2$O$_3$ and CaCl$_2$ (Sb 0.38%; Ca 0.136%)
Sb/Cu$^+$: Mixture of Sb$_2$O$_3$ and CuI (Sb 0.38%; Cu$^+$ 0.164%)
Sb/Ca/Cu$^+$: Mixture of Sb$_2$O$_3$, CaCl$_2$, and CuI (Sb 0.25%; Cu 0.091%; and Cu$^+$ 0.109%)

The corrosion rates (lb/ft$^2$) using the binary and ternary mixtures of Sb are shown in Table V.

TABLE V

| | | HCl Corrosion Rate | | Mud Acid Corrosion Rate | |
|---|---|---|---|---|---|
| Sample | Metal | N-80 | Cr-2205 | Sample | N-80 | Cr-2205 |
| A-3 | Sb | 0.0095 | 0.0089 | A-4 | 0.0078 | 0.0109 |
| NA-5 | Sb/Al | 0.0095 | 0.0070 | NA-6 | 0.0143 | 0.0125 |
| NA-7 | Sb/Al/Cu$^+$ | 0.0115 | 0.0111 | NA-8 | 0.0078 | 0.0131 |
| NA-9 | Sb/Ca | 0.0066 | 0.0060 | NA-10 | 0.0086 | 0.0030 |
| NA-11 | Sb/Cu$^+$ | 0.0064 | 0.0086 | NA-12 | 0.0070 | 0.0041 |
| NA-13 | Sb/Ca/Cu$^+$ | 0.0069 | 0.0069 | NA-14 | 0.0042 | 0.0047 |

A comparison of the Table V data reveals that the nonacetylenic samples (NA) performed generally as good as, and frequently better, than the acetylenic samples (A-3 and A-4). Samples NA-9 through NA-14, containing the binary and ternary mixtures of Sb, Ca and Cu$^+$, gave exceptional results vis-a-vis Samples A-3 and A-4. Although the nonacetylenic Sb and Al mixtures (Samples NA-5 through NA-8) performed generally the same as Samples A-3 and A-4, it is noted that the total metal content of the acetylenic samples was almost 50% higher than the metal content of the nonacetylenic samples. Moreover, the Sb content of the nonacetylenic samples was one-half or less than the Sb content of Samples A-3 and A-4 with the balance being Al or Al/Cu$^+$. It was surprising that substituting the less expensive Al and Al/Cu$^+$ blend in the nonacetylenic samples gave comparable protection as the acetylenic samples, even at the lower total metal content.

What is claimed is:

1. A liquid system for use in the treatment of a subterranean formation comprising
   (a) an aqueous acid solution; and
   (b) a nonacetylenic corrosion inhibitor comprising
      (i) a complex formed by reacting from 0.04 to 2.0 wt % of an antimony compound with from 0.2 to 10 wt % of a quaternary ammonium compound, said complex being dispersed in the aqueous acid solution; and
      (ii) from 0.1 to 25 wt % of a surfactant dissolved in the aqueous solution, said surfactant being capable of water wetting metal, said wt % being based on the weight of the aqueous acid solution.

2. The system of claim 1 wherein the antimony compound is SbCl$_3$ derived by reacting Sb2O3 with the acid solution.

3. The system of claim 1 wherein the concentration of the antimony compound in the aqueous acid solution is between 0.070 wt % and 0.8 wt %.

4. The system in claim 1 wherein the aqueous acid solution is selected from the group consisting of HCl and HCl/HF blends.

5. The system of claim 1 wherein the pipe is made of high alloy chrome steel.

6. The system of claim 1 wherein the surfactant is nonionic having an HLB no. between 8 and 18.

* * * * *